(12) United States Patent
Lee et al.

(10) Patent No.: US 10,693,915 B2
(45) Date of Patent: *Jun. 23, 2020

(54) SECURE POLICY AUDIT IN SHARED ENFORCEMENT ENVIRONMENT

(71) Applicant: INTERNATIONAL BUSINESS MACHINES CORPORATION, Armonk, NY (US)

(72) Inventors: Cheng-Ta Lee, Taipei (TW); Ronald B. Williams, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/012,279

(22) Filed: Jun. 19, 2018

(65) Prior Publication Data
US 2018/0302445 A1 Oct. 18, 2018

Related U.S. Application Data

(63) Continuation of application No. 14/884,232, filed on Oct. 15, 2015, now Pat. No. 10,044,758.

(51) Int. Cl.
*H04L 29/06* (2006.01)
*H04L 9/32* (2006.01)
(Continued)

(52) U.S. Cl.
CPC ............ *H04L 63/20* (2013.01); *H04L 63/102* (2013.01); *H04L 63/1433* (2013.01); *H04L 63/08* (2013.01); *H04L 63/10* (2013.01)

(58) Field of Classification Search
None
See application file for complete search history.

(56) References Cited

U.S. PATENT DOCUMENTS

| 7,921,459 B2 | 4/2011 | Houston et al. |
| 8,056,130 B1 | 11/2011 | Njemanze et al. |

(Continued)

FOREIGN PATENT DOCUMENTS

| EP | 0325777 | 8/1989 |
| EP | 0658837 | 6/1995 |

(Continued)

OTHER PUBLICATIONS

List of IBM Patents or Patent Applications Treated as Related dated Jun. 19, 2018, 2 pages.

(Continued)

*Primary Examiner* — Alexander Lagor
(74) *Attorney, Agent, or Firm* — Tutunjian & Bitetto, P.C.; Jeffrey S. LaBaw

(57) ABSTRACT

A method and system are provided that, in turn, provide a secure policy audit in a shared enforcement environment. The method includes providing an auditing component in a software defined network. The method further includes receiving, by the auditing component, a first auditing event from a first component in the software defined network and a related auditing event from a second component in the software defined network. The method also includes analyzing, by the auditing component, the first auditing event and the related auditing event against an enforcement of an access policy criteria for the software defined network. The access policy criteria requires auditing events from at least two enforcement points in the software defined network. The first and second component form the at least two enforcement points. The method additionally includes determining, by the auditing component, one of a compliance and a non-compliance with the access policy criteria.

20 Claims, 8 Drawing Sheets

(51) Int. Cl.
*H04L 9/00*       (2006.01)
*H04L 12/28*      (2006.01)

(56)         References Cited

U.S. PATENT DOCUMENTS

| | | |
|---|---|---|
| 2012/0185913 A1 | 7/2012 | Martinez et al. |
| 2012/0216243 A1 | 8/2012 | Gill et al. |
| 2013/0097662 A1 | 4/2013 | Pearcy et al. |
| 2013/0291052 A1 | 10/2013 | Hadar et al. |
| 2014/0149494 A1 | 5/2014 | Markley et al. |
| 2014/0165200 A1 | 6/2014 | Singla |
| 2016/0330626 A1* | 11/2016 | Barillaud ............ H04L 63/0861 |

FOREIGN PATENT DOCUMENTS

| | | |
|---|---|---|
| EP | 1160645 | 12/2001 |
| EP | 2667564 | 11/2013 |

OTHER PUBLICATIONS

Shin, et al., "FRESCO: Modular Composable Security Services for Software-Defined Networks", 20th Annual Network & Distributed System Security Symposium, Feb. 2013, pp. 1-16.

\* cited by examiner

US 10,693,915 B2

SECURE POLICY AUDIT IN SHARED ENFORCEMENT ENVIRONMENT

BACKGROUND

Technical Field

The present invention relates generally to security and, in particular, to a secure policy audit in a shared enforcement environment.

Description of the Related Art

Policy is by definition a principle or protocol to guide decisions and achieve rational outcomes. Applied to systems, policy would seem to require the ability to be enforced, and the ability to be audited. Enforcement is the simple enactment of an action based on a policy. Audit is simply the verification that a particular policy was enacted. The verification, or audit of an action has two potential outcomes. One reflects a positive outcome, that is, that the policy was indeed enacted. The other is that there was a failure to enact a given policy, that a result other than expected was achieved. In systems that include a number of components, more than two or more system components may have the ability to enact or enforce specific system policy, in that they control the same kind of actions, though at different parts of the systems work flow. It is useful in such cases to be able to define the action represented by a policy statement once, and then allow the implementer to assign the policy to the appropriate enforcement point. For reasons of system efficiency, it may be useful to assign the same policy to multiple enforcement points in such a way that the combination of each enforcement point's action results in fulfillment of the policy, but where each individually only fulfills a part of the total.

SUMMARY

According to an aspect of the present principles, a method is provided. The method, in turn, is for providing a secure policy audit in a shared enforcement environment. The method includes providing an auditing component in a software defined network. The method further includes receiving, by the auditing component, a first auditing event from a first component in the software defined network and a related auditing event from a second component in the software defined network. The method also includes analyzing, by the auditing component, the first auditing event and the related auditing event against an enforcement of an access policy criteria for the software defined network. The access policy criteria requires auditing events from at least two enforcement points in the software defined network. The first component and the second component form the at least two enforcement points. The method additionally includes determining, by the auditing component, one of a compliance and a non-compliance with the access policy criteria for the software defined network.

According to another aspect of the present principles, a computer program product is provided. The computer program product, in turn, is for providing a secure policy audit in a shared enforcement environment. The computer program product includes a computer readable storage medium having program instructions embodied therewith. The program instructions are executable by a computer to cause the computer to perform a method. The method includes providing an auditing component in a software defined network. The method further includes receiving, by the auditing component, a first auditing event from a first component in the software defined network and a related auditing event from a second component in the software defined network. The method also includes analyzing, by the auditing component, the first auditing event and the related auditing event against an enforcement of an access policy criteria for the software defined network. The access policy criteria requires auditing events from at least two enforcement points in the software defined network. The first component and the second component form the at least two enforcement points. The method additionally includes determining, by the auditing component, one of a compliance and a non-compliance with the access policy criteria for the software defined network.

According to yet another aspect of the present principles, a system is provided. The system is for providing a secure policy audit in a shared enforcement environment. The system includes an auditing component, disposed in a software defined network, for receiving a first auditing event from a first component in the software defined network and a related auditing event from a second component in the software defined network, analyzing the first auditing event and the related auditing event against an enforcement of an access policy criteria for the software defined network, and determining one of a compliance and a non-compliance with the access policy criteria for the software defined network. The access policy criteria requires auditing events from at least two enforcement points in the software defined network. The first component and the second component form the at least two enforcement points.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to a secure policy audit in a shared enforcement environment.

As an example, in a Software Defined Networking (SDN), whether controlling physical devices or virtual devices (as in a Cloud Deployment), an SDN Switch may work in concert with an Intrusion Prevention System (IPS) to efficiently control access of one subnet to another. There are innumerable examples of this kind of "shared policy enforcement" across a myriad of systems today. However, a key requirement of system policy, is the ability to verify expected operation when policy enforcement is enacted over two or more enforcement points. The present principles specifically address this challenge.

Figure 1:
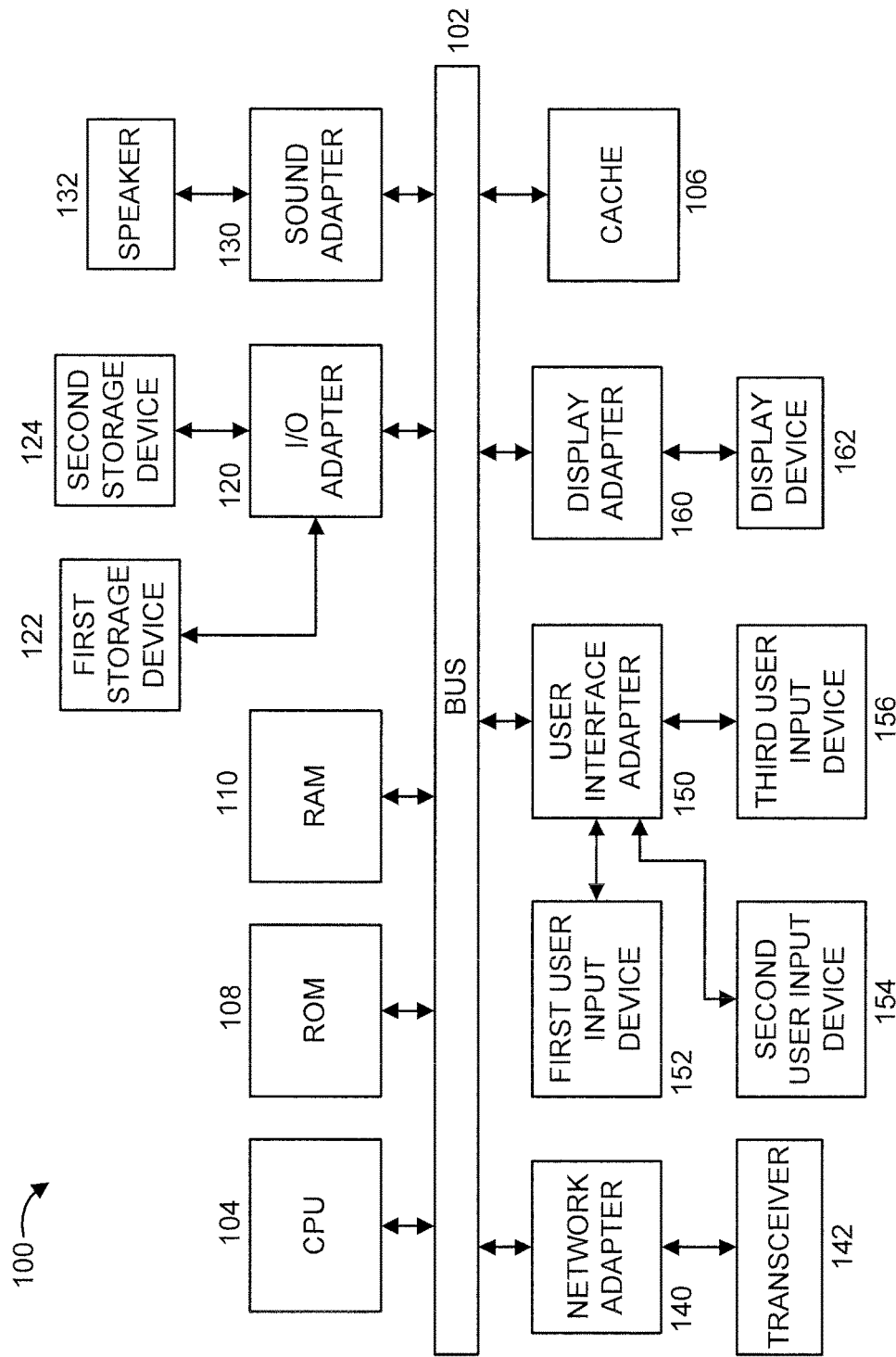
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
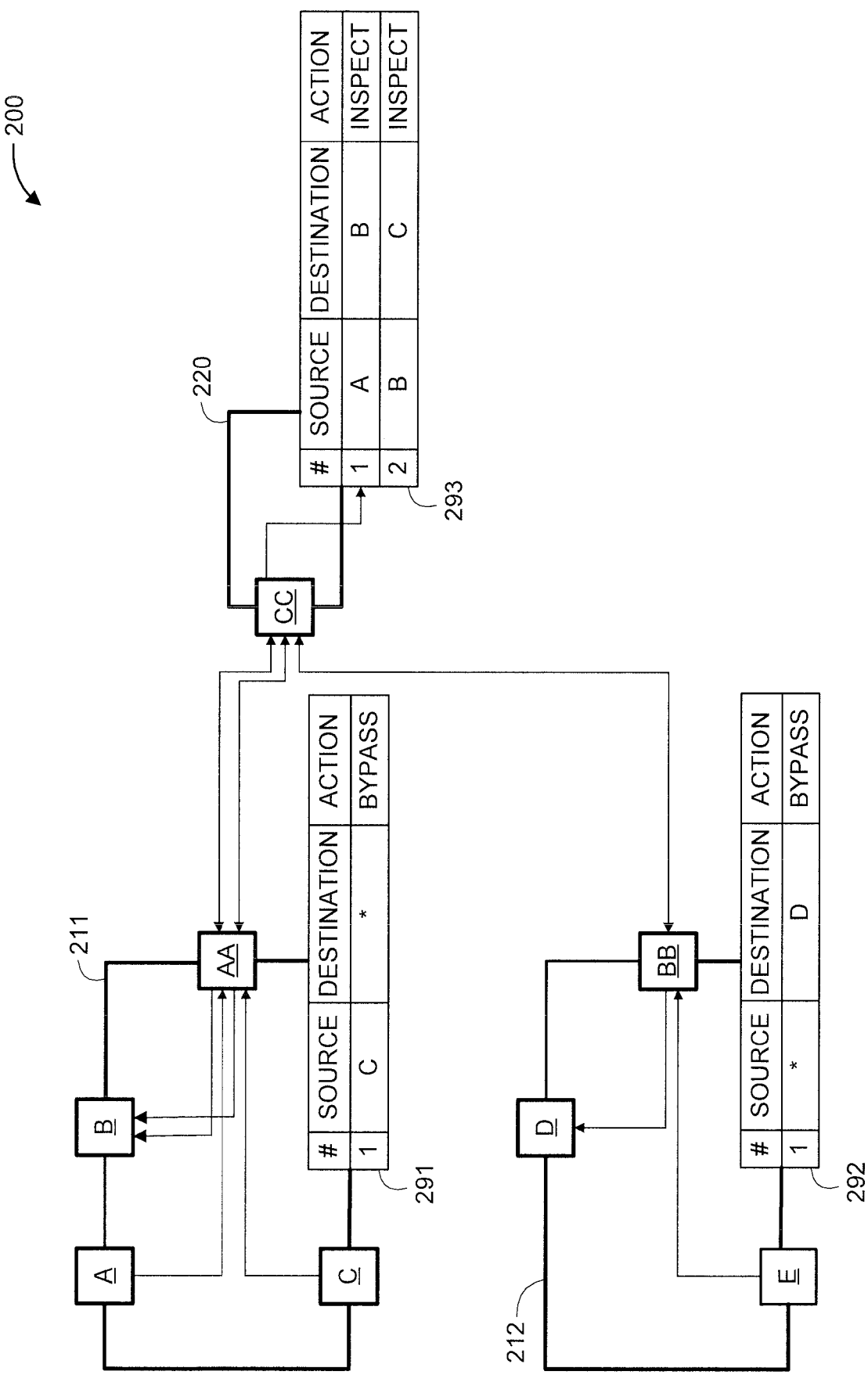
FIG. 2 shows an exemplary system 200 that performs policy enforcement 200 at multiple enforcement points within the system 200, in accordance with an embodiment of the present principles.
Figure 3:
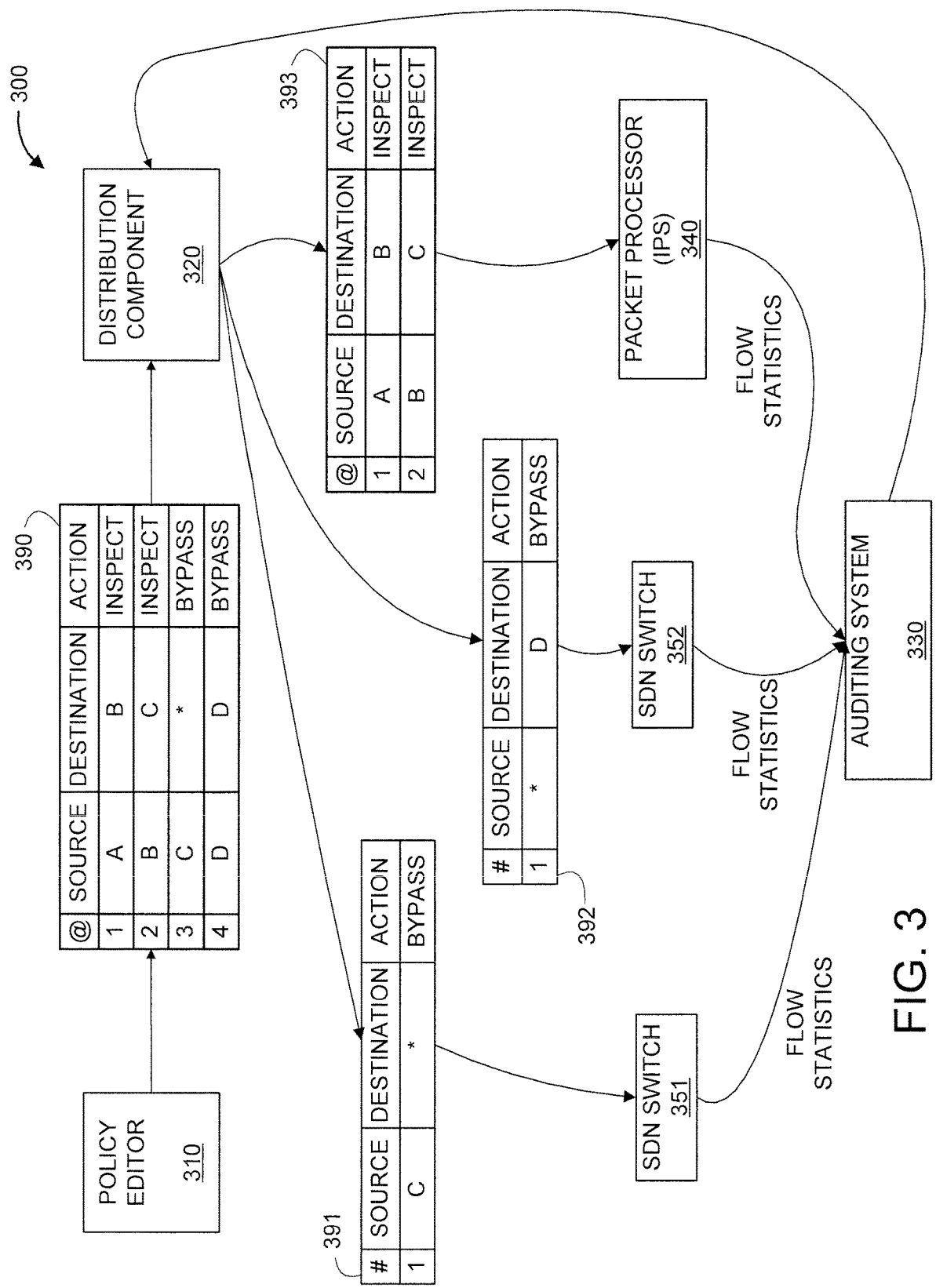
FIG. 3 shows another exemplary system 300 that performs policy enforcement 200 at multiple enforcement points within the system 300, in accordance with an embodiment of the present principles.

Moreover, it is to be appreciated that systems 200 and 300 described below with respect to FIGS. 2 and 3 are systems for implementing respective embodiments of the present principles. Part or all of processing system 100 may be implemented in one or more of the elements of system 200 and/or system 300.

Figure 4:
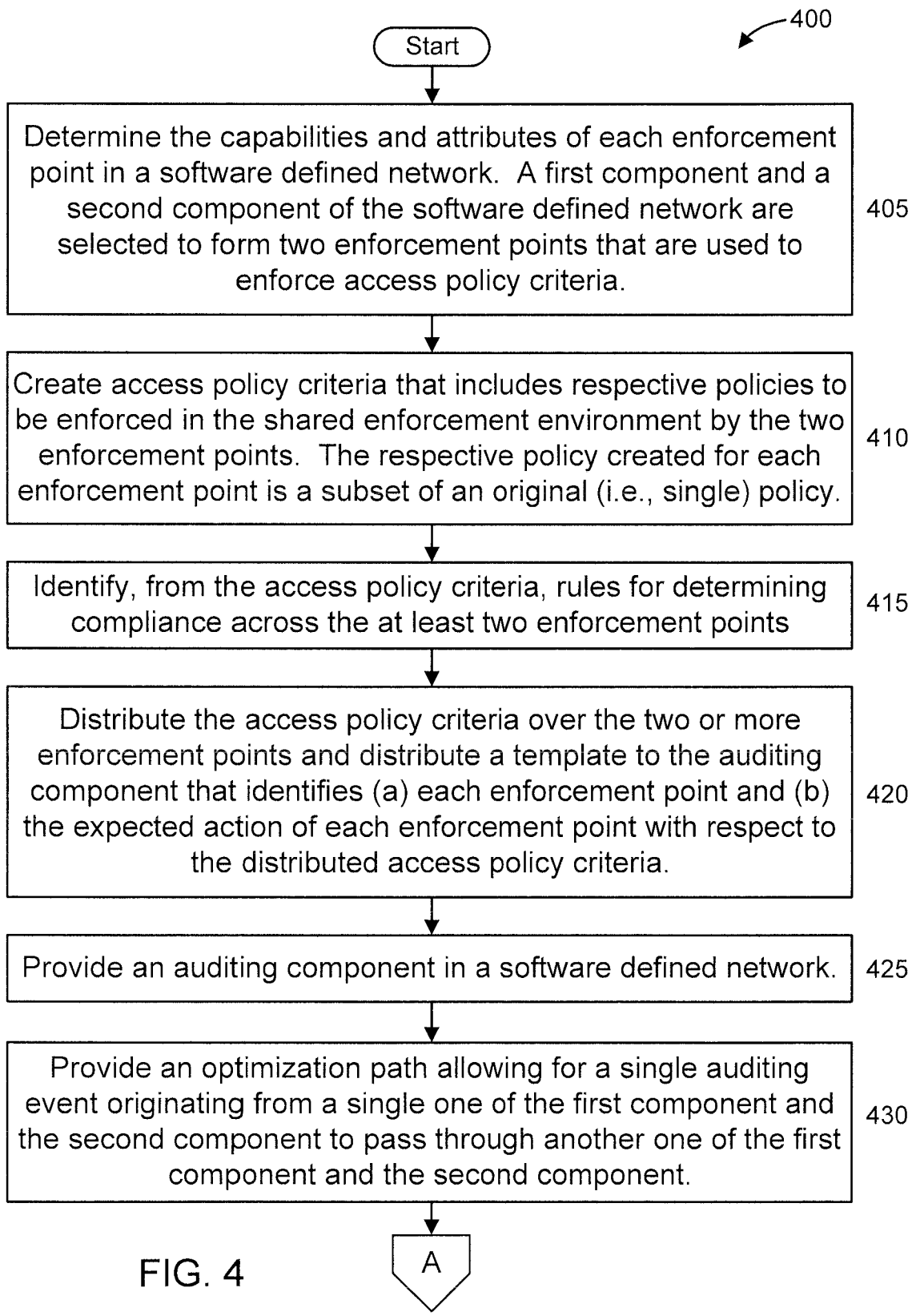
FIGS. 4-5 show an exemplary method 400 for secure policy auditing in a shared enforcement environment, in accordance with an embodiment of the present principles.
Figure 5:
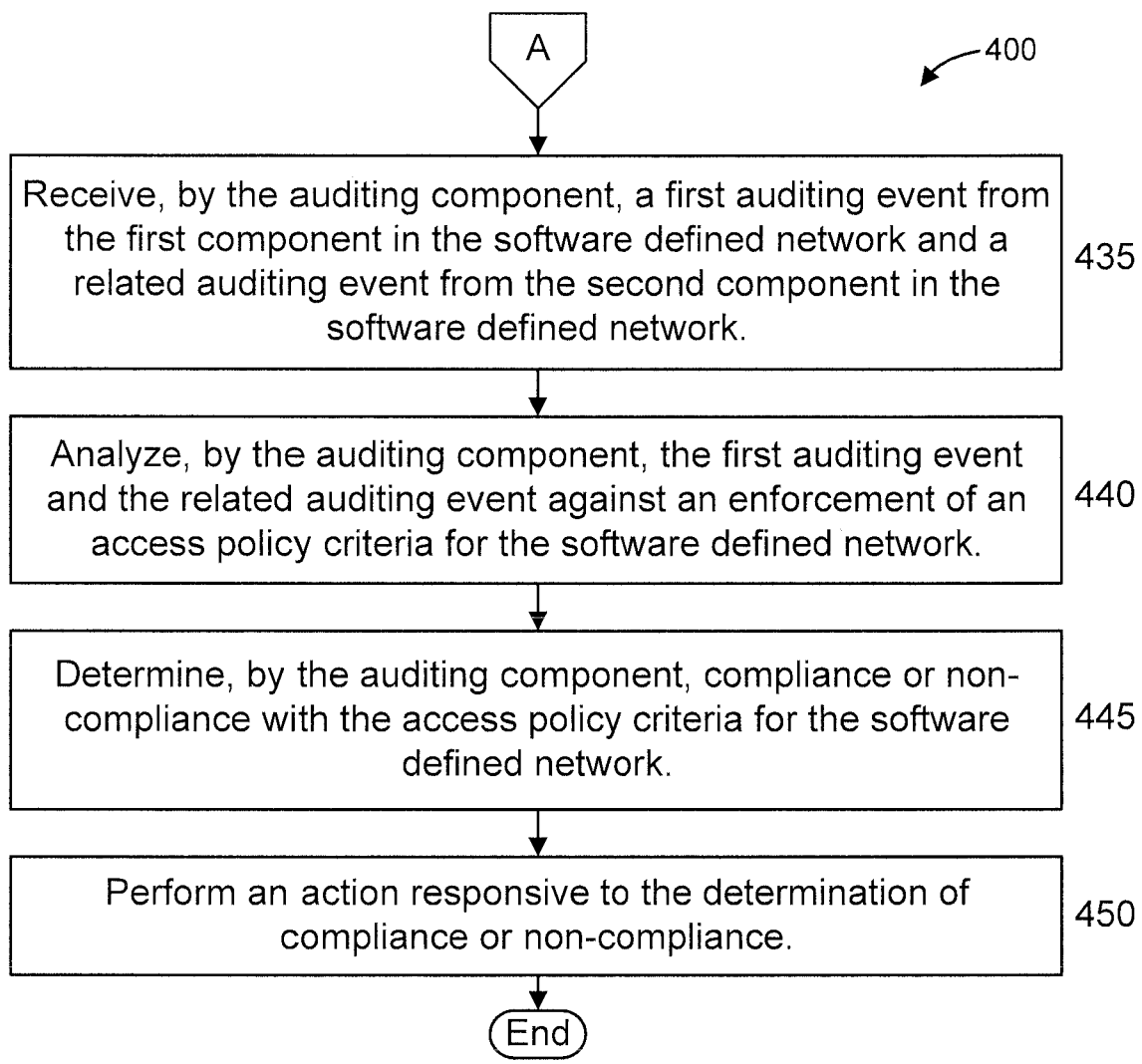

Further, it is to be appreciated that processing system 100 may perform at least part of the method described herein including, for example, at least part of method 400 of FIGS. 4-5. Similarly, part or all of system 200 and/or system 300 may be used to perform at least part of method 400 of FIGS. 4-5.

FIG. 2 shows an exemplary system 200 that performs policy enforcement 200 at multiple enforcement points within the system 200, in accordance with an embodiment of the present principles.

The example of FIG. 2 is employed in an environment having a first SDN switch 211, a second SDN switch 212, and a packet processor (IPS) 220.

The first SDN switch 211 includes ports A, B, and C. The second SDN switch 212 includes ports D and E. The first SDN switch 211 also includes a port AA for interfacing with a port CC of the packet processor (IPS) 220. The second switch 212 also includes a port BB for interfacing with the port CC of the packet processor (IPS) 220.

The first switch 211 includes a policy template 291 specifying one or more policies the first switch 211 is to enforce. The second switch 212 includes a policy template 292 specifying one or more policies the second switch 212 is to enforce. The packet processor (IPS) 220 includes a policy template 293 specifying one or more policies the packet processor (IPS) 220 is to enforce.

In order to have the best resource utilization, the policies for traffic bypassing are deployed to the SDN switches 211 and 212 directly. As the result, packet processor (IPS) 220 will only receive the traffic that need to be inspected, therefore it could concentrate on the important traffic. Both the switches 211 and 212 and the packet processor (IPS) 220 participate in a single policy and, in this case, the packet processor (IPS) 220 could fulfill the entire policy. For optimal use of resources however, and because the switches 211 and 212 (in this case) can "know" when they receive a packet whether they should sent the packet to the packet processor (IPS) 220, the switches 211 and 212 should enforce their policy. However, in the case where the packet processor (IPS) 220 forwards traffic that may still undergo enforcement at the next step, in this case the packet processor (IPS) 220, the activities of both the switches 211 and 212 and the packet processor (IPS) 220 must be combined and evaluated to determine whether or not the policy has been fulfilled or violated.

In the embodiment shown in FIG. 2, at least one of the elements of system 200 is processor-based (e.g., at least IPS 220). Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, while only two SDN switches are shown, other embodiments can involve other numbers of switches. These and other variations of the elements of system 200 are readily determined by one of ordinary skill in the art, given the teachings of the present principles provided herein, while maintaining the spirit of the present principles.

A brief description of a system that performs policy enforcement at a single enforcement point and its deficiencies will now be described in order to show how system 200 provides a better solution using multiple enforcement points.

With a single enforcement point, there is one policy. It is a trivial audit involving comparing the action of the enforcement point with the policy that is intended to control it. When network security control or routing policy is enforced across different elements of a system, as to avoid duplication of effort, the activities of the elements that form the total policy need to be audited (compared) with the enforcement each performs. This comparison (audit) across one or more enforcement points involves aggregating the combined effect and comparing it against the policy that controls them.

A packet inspection device, formed by a packet processor IPS, will receive not only traffic that needs to be inspected, but will also receive traffic that is designated to be simply bypassed. Thus, receiving the unnecessary traffic forwarded by SDN switches on the packet processor IPS is a waste of resources. This deficiency is overcome by system 200 shown and described with respect to FIG. 2, as well as by system 300 shown and described with respect to FIG. 3.

Thus, in contrast to a system that performs policy enforcement at a single enforcement point, the present principles advantageously distribute a single policy over two or more enforcement points, and (2) capture the expected combined results in an "audit policy" that can be distributed to an auditing system. The auditing system correlates events it collects from two or more enforcement points, and compare their outcomes to the policy which effected their action.

FIG. 3 shows another exemplary system 300 that performs policy enforcement 200 at multiple enforcement points within the system 300, in accordance with an embodiment of the present principles.

The system includes a policy editor 310, a distribution component 320, an auditing system 330, a packet processor (IPS) 340, a first SDN switch 351 and a second SDN switch 352.

The policy editor 310 includes a user interface that allows a user, administrator, and so forth, to edit the policy as needed, depending upon the implementation.

The distribution component 320 collects the capabilities and attributes of each enforcement point, uses them to create the policy for each enforcement point, and then deploys the policies. The policy created for each point is a subset of the original policy. In an embodiment, two policies for two points could be fulfilled in either enforcement point (overlap). A main task of the distribution component 620 is to optimize the resource utilization of each point by developing the well design policies which fits the capabilities of each enforcement point.

At the same time, as the appropriate parts of the policy are distributed to the switches and the packet processor (IPS) 340, a template is distributed to the auditing system 330 that identifies (a) each enforcement point, and (b) the expected action of each with respect to the policy distributed. In an embodiment, the appropriate parts of the policy are provided in the form of a template or table. Of course, other data constructs can also be used. From the distribution component 320, the first SDN switch 351 receives a template 391, the second SDN switch 352 receives a template 392, and the packet processor 340 receives a template 393. The overall policy is in template 390.

Verification of the policy by the auditing system 330 is determined by up to M(**)n potential states, where M is the number of potential results (usually 2), and n is the number of enforcement points. In the case where the actions of each are required to fulfill policy, each can have a result of "fulfilled" or unfulfilled, in which case M=2.

Therefore, the auditing system 330 collects the results of each (four possible: unfulfilled/unfulfilled, fulfilled/unfulfilled, unfulfilled/fulfilled, fulfilled/fulfilled). If both enforcement point share aspects of enforcement, then to achieve a "fulfilled" result, the auditing system 330 must collect events from both with status 'fulfilled,' otherwise it determines the overall policy requirement is "unfulfilled".

A main aspect of the present principles is (1) obtaining from the audit policy sufficient information as to (a) the combined result for verification, and (b) the result expected from each component.

In the embodiment shown in FIG. 3, at least one of the elements of system 300 is processor-based (e.g., at least IPS 340). Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, while only two SDN switches are shown, other embodiments can involve other numbers of switches. These and other variations of the elements of system 300 are readily determined by one of ordinary skill in the art, given the teachings of the present principles provided herein, while maintaining the spirit of the present principles.

FIGS. 4-5 show an exemplary method 400 for secure policy auditing in a shared enforcement environment, in accordance with an embodiment of the present principles.

At step 405, determine the capabilities and attributes of each enforcement point in a software defined network. In an embodiment, the capabilities and attributes are collected directly from each enforcement point or an element aware of the capabilities and attributes of the enforcement points. In the embodiment of FIG. 4, a first component and a second component of the software defined network are selected to form two enforcement points that are used to enforce access policy criteria.

At step 410, create access policy criteria that includes respective policies to be enforced in the shared enforcement environment by the two enforcement points. The respective policy created for each enforcement point is a subset of an original (i.e., single) policy. In an embodiment, the policy created for each enforcement point overlaps with the other enforcement point, such that it is possible that the (two) respective policies for each enforcement point could be fulfilled by either enforcement point. In an embodiment, the policy is created based the original policy and on the capabilities and attributes determined at step 405.

At step 415, identify, from the access policy criteria, rules for determining compliance across the at least two enforcement points At step 420, distribute the access policy criteria (the respective policies) over the two or more enforcement points (first component and the second component in the software defined network) and distribute a template to the auditing component that identifies (a) each enforcement point and (b) the expected action of each enforcement point with respect to the distributed access policy criteria (that is, with respect to its respective policy that forms at least a subset of all policy covered by the access policy criteria). In an embodiment, the first component/enforcement point receives a respective policy to be enforced thereat, and the second component/enforcement point receives its own respective policy to be enforced thereat.

At step 425, provide an auditing component in a software defined network.

At step 430, provide an optimization path allowing for a single auditing event originating from a single one of the first component and the second component to pass through another one of the first component and the second component.

At step 435, receive, by the auditing component, a first auditing event from the first component in the software defined network and a related auditing event from the second component in the software defined network. The auditing events can include one or more types of information including, but not limited to, security events, network flow information, and so forth. The auditing component can be configured to request and/or otherwise extract particular types of events from the enforcement points.

At step 440, analyze, by the auditing component, the first auditing event and the related auditing event against an enforcement of an access policy criteria for the software defined network. The access policy criteria requires auditing events from at least two enforcement points in the software defined network. Thus, in the case where the overlap in respective policies enables a single component to enact the entirety of the access policy criteria (that is, both respective policies for both respective enforcement points), an auditing event from one component can indicate and/or otherwise represent full compliance with the entirety of the access policy criteria (that is, its respective policy and any other respective policies of other enforcement points) while a related auditing event from the other component can indicate and/or otherwise represent non-compliance with its respective policy.

At step 445, determine, by the auditing component, compliance or non-compliance with the access policy criteria for the software defined network. In an embodiment, step 445 involves determining compliance or non-compliance using the rules identified at step 415 for determining compliance across the at least two enforcement points.

At step 450, perform an action responsive to the determination of compliance or non-compliance. For example, for a determination of compliance, one or more of the following actions can be performed: providing a user perceptible indication of the compliance, and so forth. Moreover, for example, for a determination of non-compliance, one or more of the following actions can be performed: providing a user perceptible indication of the non-compliance, shutting down a machine not properly cooperating to achieve compliance, reconfiguring a machine not properly cooperating to achieve compliance, and so forth. It is to be appreciated that the preceding actions are merely illustrative and, thus, other actions can also be performed in accordance with the teachings of the present principles, while maintaining the spirit of the present principles.

Thus, the present principles are directed to determining whether or not policy, enforced at two or more enforcement points, has been complied with. The present principles advantageously make the determination using existing data. These and other advantages of the present principles are readily determined by one of ordinary skill in the art, given the teachings of the present principles provided herein, while maintaining the spirit of the present principles.

An example scenario will now be described to which the present principles can be applied, in accordance with an embodiment of the present principles.

A system policy governs the control of communication between point E1 and point E2. Two enforcement points, P1 and P2 are interposed between E1 and E2, resulting in a transmission path E1-P1-P2-E2. If a Policy "P" controls transmission between E1 and E2, then the policy P may be applied to P1, or P2. If P can be decomposed into two or more sub-policies p1 and p2 (or more) such that p1+p2=P; and if p1 can be applied to enforcement point P1, and policy p2 to P2, then policy P can be said to be enforced across the transmission path. These and other scenarios to which the present principles can be applied are readily determined by one of ordinary skill in the art, given the teachings of the present principles provided herein, while maintaining the spirit of the present principles.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
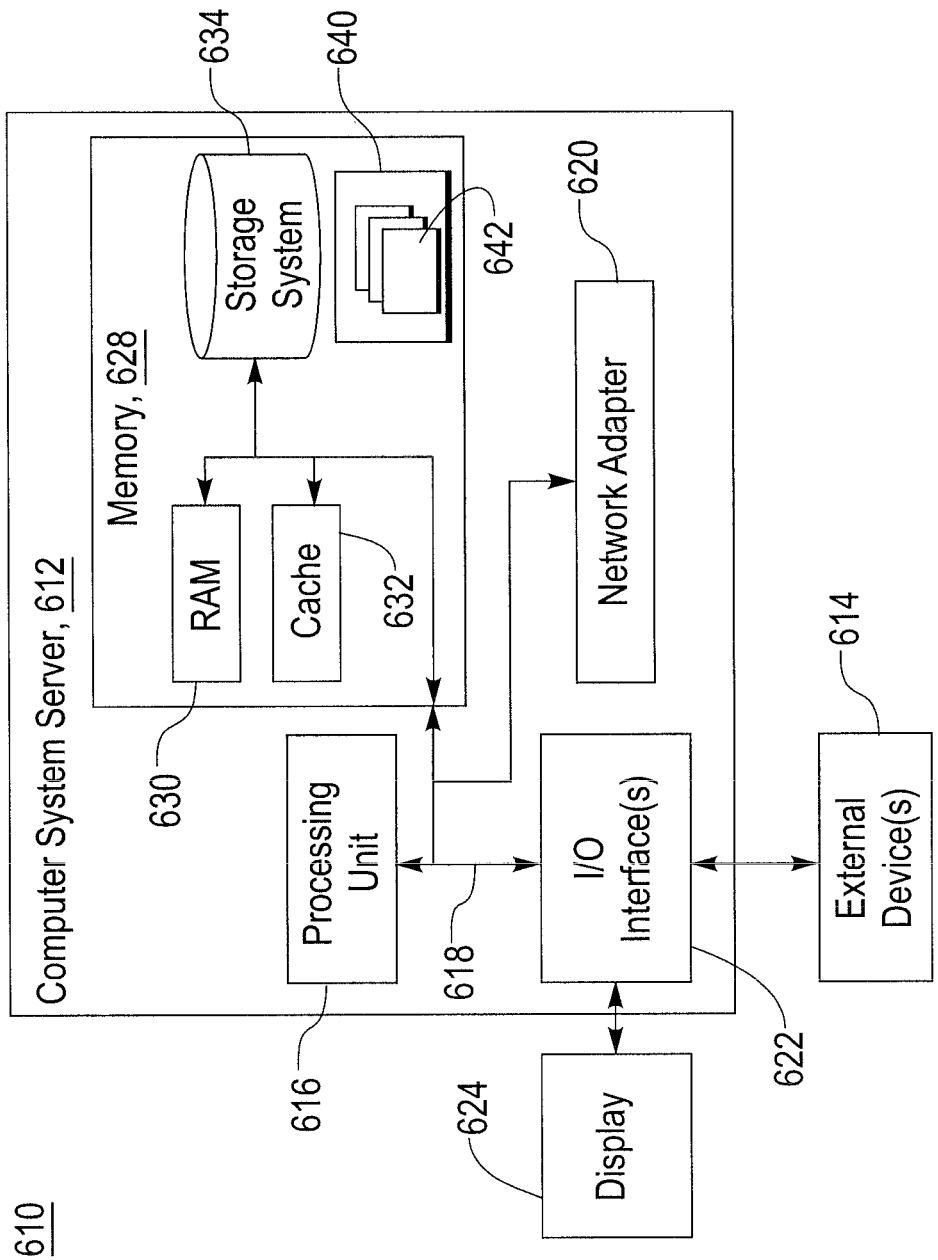
FIG. 6 shows an exemplary cloud computing node 610, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
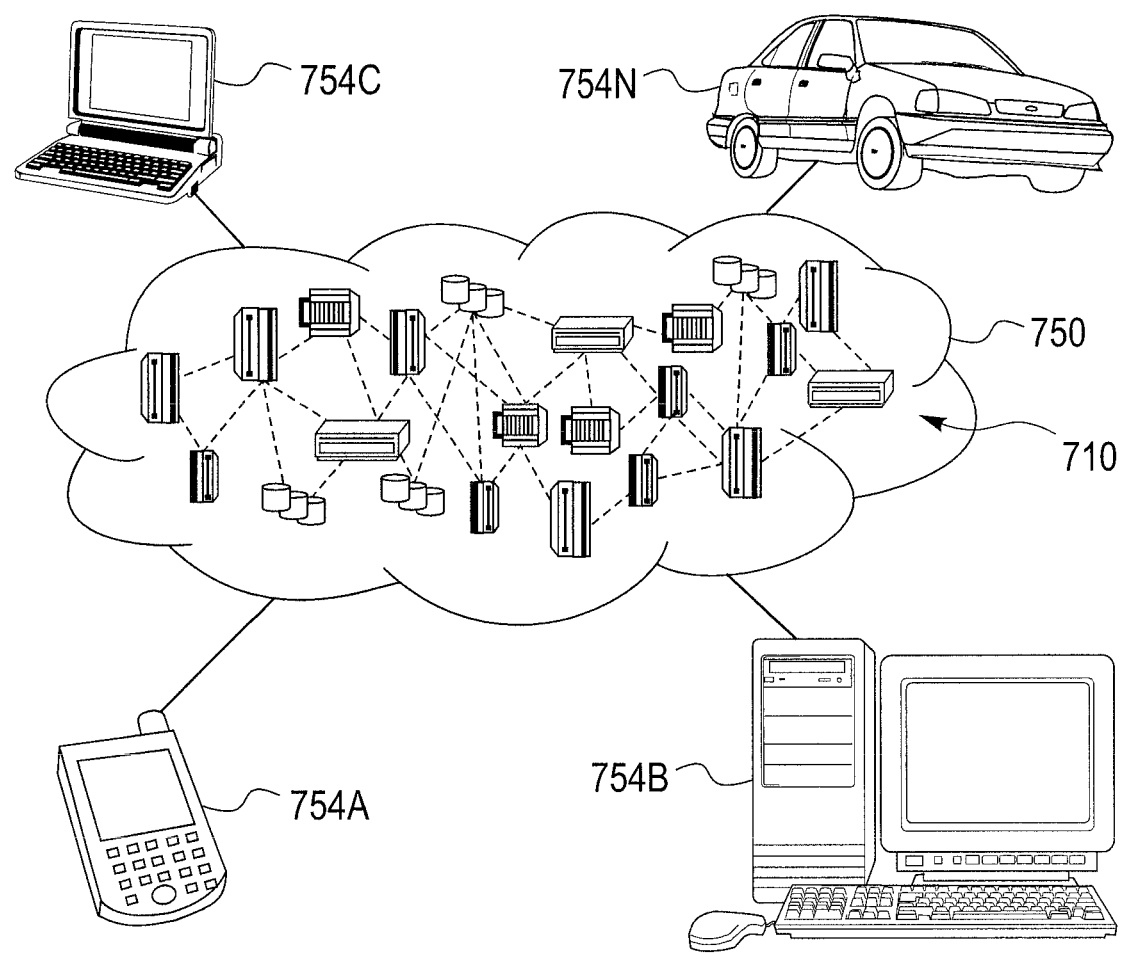
FIG. 7 shows an exemplary cloud computing environment 750, in accordance with an embodiment of the present principles.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
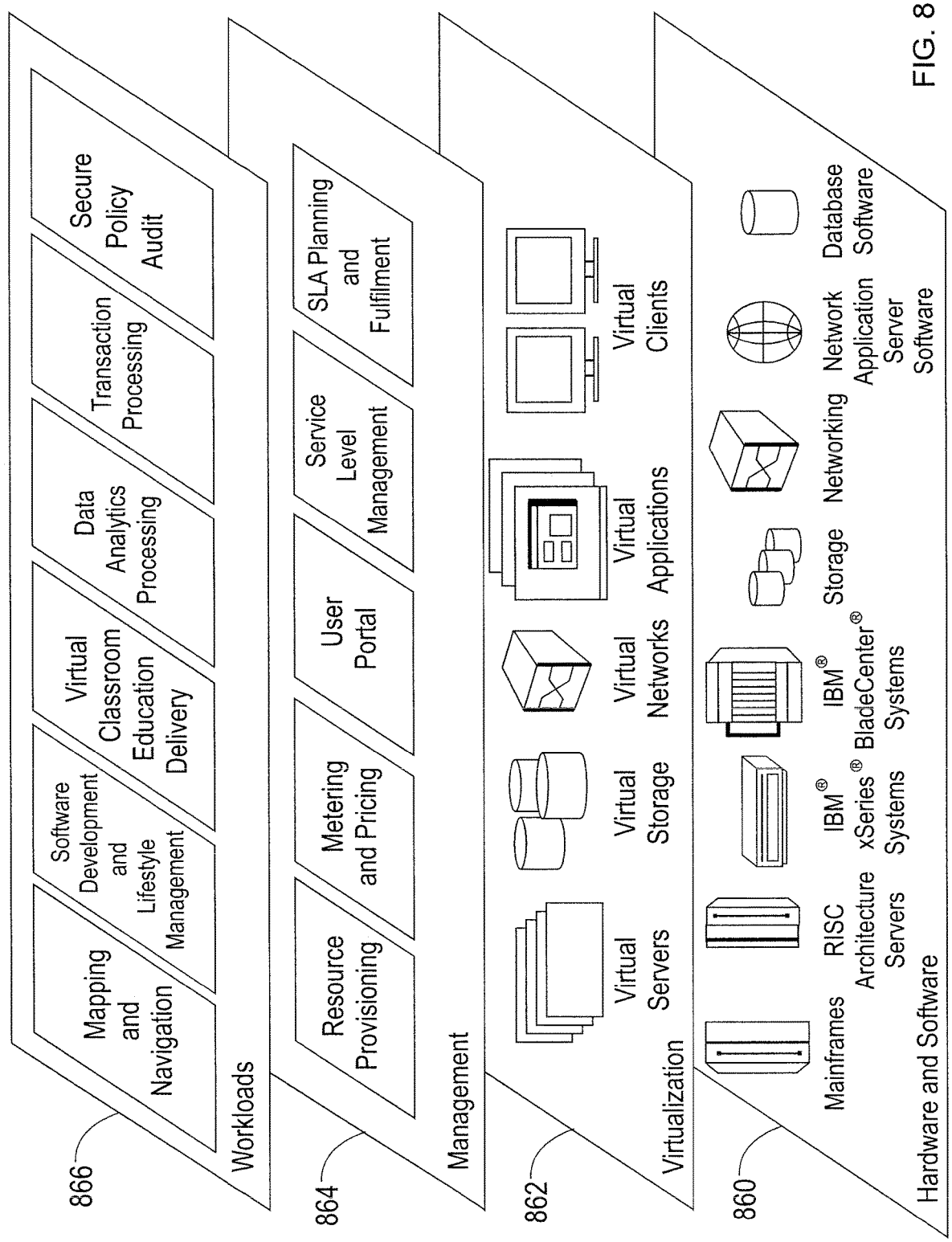
FIG. 8 shows exemplary abstraction model layers, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and secure policy audit in shared enforcement environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for providing a secure policy audit in a shared enforcement environment, the method comprising:
    receiving, by an auditing component in a network, a first auditing event from a first component in the network and a related auditing event from a second component in the network;
    analyzing, by the auditing component, the first auditing event and the related auditing event against an enforcement of an access policy criteria for the network, the access policy criteria comprising auditing events from at least two enforcement points in the network, wherein particular types of events are selected for extraction; and
    controlling access from one subnet to another based on a determining, by the auditing component, one of a compliance or non-compliance with the access policy criteria.

2. The method of claim 1, wherein the network is a software defined network, the software defined network being a distributed network with a packet processor, shared switches, and virtual devices.

3. The method of claim 1, further comprising identifying, from the access policy criteria, rules for determining compliance across the at least two enforcement points in the network, wherein a result of said determining step is based on the rules.

4. The method of claim 1, further comprising providing an optimization path allowing for a single auditing event originating from a single one of the first component and the second component to pass through another one of the first component and the second component.

5. The method of claim 1, further comprising determining capabilities and attributes of each of the at least two enforcement points in the network.

6. The method of claim 1, wherein the access policy criteria comprises a respective policy for each of the at least two enforcement points, wherein the respective policy for a given one of the at least two enforcement points at least partially overlaps with the respective policy for another one of the at least two enforcement points.

7. The method of claim 6, wherein an overlap amount enables the given one of the at least two enforcement points to selectively perform a subset of the access policy criteria or all of the access policy criteria.

8. The method of claim 6, further comprising distributing the respective policy to each of the at least two enforcement points.

9. The method of claim 6, wherein the non-compliance with the access policy criteria is determined responsive to at least one of the at least two enforcement points failing to fulfill the respective policy therefor.

10. The method of claim 1, wherein the access policy criteria is formed based on capabilities and attributes of each of the at least two enforcement points in the network.

11. A computer program product for providing a secure policy audit in a shared enforcement environment, the computer program product comprising a non-transitory computer readable storage medium having program instructions embodied therewith, the program instructions executable by a computer to cause the computer to perform a method comprising:
receiving, by an auditing component in a network, a first auditing event from a first component in the network and a related auditing event from a second component in the network;
analyzing, by the auditing component, the first auditing event and the related auditing event against an enforcement of an access policy criteria for the network, the access policy criteria comprising auditing events from at least two enforcement points in the network, wherein particular types of events are selected for extraction; and
controlling access from one subnet to another based on a determining, by the auditing component, one of a compliance or non-compliance with the access policy criteria.

12. The computer program product of claim 11, further comprising providing an optimization path allowing for a single auditing event originating from a single one of the first component and the second component to pass through another one of the first component and the second component.

13. The computer program product of claim 11, wherein the access policy criteria comprises a respective policy for each of the at least two enforcement points, wherein the respective policy for a given one of the at least two enforcement points at least partially overlaps with the respective policy for another one of the at least two enforcement points.

14. The computer program product of claim 13, wherein an overlap amount enables the given one of the at least two enforcement points to selectively perform a subset of the access policy criteria or all of the access policy criteria.

15. The computer program product of claim 11, wherein the access policy criteria is formed based on capabilities and attributes of each of the at least two enforcement points in the network.

16. A system for providing a secure policy audit in a shared enforcement environment, the system comprising:
a processor operatively coupled to a memory, the processor configured for:
auditing, using an auditing component, disposed in a network, configured for:
receiving a first auditing event from a first component in the network and a related auditing event from a second component in the network;
analyzing the first auditing event and the related auditing event against an enforcement of an access policy criteria for the network, the access policy criteria comprising auditing events from at least two enforcement points in the network, wherein particular types of events are selected for extraction; and
controlling access from one subnet to another based on a determining, by the auditing component, one of a compliance or non-compliance with the access policy criteria.

17. The system of claim 16, further comprising an optimization path allowing for a single auditing event originating from a single one of the first component and the second component to pass through another one of the first component and the second component.

18. The system of claim 16, wherein the access policy criteria comprises a respective policy for each of the at least two enforcement points, wherein the respective policy for a given one of the at least two enforcement points at least partially overlaps with the respective policy for another one of the at least two enforcement points.

19. The system of claim 18, wherein an overlap amount enables the given one of the at least two enforcement points to selectively perform a subset of the access policy criteria or all of the access policy criteria.

20. The system of claim 16, wherein the access policy criteria is formed based on capabilities and attributes of each of the at least two enforcement points in the network.

* * * * *